UNITED STATES PATENT OFFICE.

LEONARD PAGET, OF NEW YORK, N. Y., ASSIGNOR TO THE EGYPTIAN LACQUER MANUFACTURING COMPANY, OF NEW JERSEY.

PYROXYLINE COMPOUND.

SPECIFICATION forming part of Letters Patent No. 494,792, dated April 4, 1893.

Application filed February 3, 1893. Serial No. 460,896. (No specimens.)

*To all whom it may concern:*

Be it known that I, LEONARD PAGET, a citizen of the United States, residing in the city, county, and State of New York, have invented certain new and useful Improvements in Pyroxyline Compounds; and I do hereby declare that the following is a full, clear, and exact description of the invention, which will enable others skilled in the art to which it appertains to make and use the same.

Compounds of pyroxyline are solid, liquid, or of an intermediate state. A solid compound is produced by acting upon soluble pyroxyline with the vapor of camphor. In such a compound, the pyroxyline has suffered what is known as "conversion." By conversion is meant that the pyroxyline has lost all structural and cellular form, and has become a homogeneous mass. A liquid compound may be produced by immersion of the pyroxyline in an active liquid solvent; in such a solution of pyroxyline conversion has first occurred and is implied. That conversion has first occurred can be shown by the experiment of treating the pyroxyline with a minimum amount of the active liquid solvent; then evaporation of the excess of solvent, if any, leaves a converted mass that by no known chemical treatment can be brought to the stage preceding conversion. Conversion and solution have therefore sometimes been used as synonymous terms in relation to liquid solvents. Conversion and solution can be produced by a simple solvent substance, such as wood alcohol, when, generally, the solution can be diluted without limit by addition of the same substance. But there are some substances as for instance some essential oils that produce conversion of the pyroxyline and throw out their own excess, that is, no more oil is taken up by the pyroxyline than is necessary to the act of conversion, that of solution in the same oil being refused. Conversion and solution can also be produced by a mixture of substances neither of which is by itself a solvent, as with alcohol and ether; and it may occur, as it does in this case, that dilution of the solution may be made without limit by one of the substances and not by the other, the addition of this other producing precipitation of the converted pyroxyline. Consequently, besides conversion and solution, there must be studied the phenomena of dilution, when an attenuated solution of pyroxyline is desired. When pyroxyline is converted and dissolved in methyl alcohol, the solution can be diluted to any desired extent with anhydrous ethyl alcohol, but not with anhydrous amyl alcohol, because the latter produces precipitation of the converted pyroxyline at an early stage, which the former does not. In fact where in the art a quick-setting gelatinous, plastic compound is required, a precipitant such as amyl alcohol may be advantagously employed to bring about a solidification and to set free the solvent more quickly. Besides these considerations there are others, especially those relating to degree of volatility, requiring attention when a more or less dilute pyroxyline compound is desired; and this sketch of the state of the art is given in explanation of the object of my invention, which is broadly to extend the list of known solvents and diluents of solvents of pyroxyline. But more specifically the object of my invention is to procure solvents of pyroxyline and diluents of solvents of pyroxline whose characteristics and properties can be more definitely determined beforehand, or so-to-say, prophetically, than is the case with those hitherto employed in the art. I have discovered such a series of solvents and diluents of solvents of pyroxyline in what are chemically known as the mixed ethers, produced by etherification of mixtures of the primary alcohols under the action of sulphuric acid or its equivalent, by the ordinary process of etherification; and I have found that according to the nature and proportion of the primary alcohols and of the acid taken, so can the resultant mixed ether have certain desired properties not to be obtained by the mixtures of the primary alcohols, but which might be the resultant of the properties of these alcohols taken individually, could such an individual use have been possible. For instance, if a solution of pyroxyline in wood alcohol be diluted with any required amount of grain alcohol and fusel oil, mixed in any desired proportions, preferably with large proportion of the fusel oil, its use, on account of desirable volatility, would fulfill many requirements; but such an admixture is impossible on account of the precipitation of the converted pyroxyline caused by the fusel oil. But I find that by submitting the fusel oil and grain alcohol to a process of distillation with sulphuric acid (that is, to the well known process of etherification), and if necessary rectifying the distillate to free the same from water, a mixed amyl-ethyl ether is obtained, having a comparatively high boiling point and desirable low volatility, which is diluent of the wood alcohol solution of pyroxyline without limit. The proportions of four parts fusel oil and one part grain alcohol will illustrate sufficiently, but I do not limit myself to any proportions, except as to such proportions as will produce a desirable mixed ether having the properties described.

In what precedes, wood alcohol has been understood to be commercial methyl alcohol; grain alcohol, commercial ethyl-alcohol; and fusel oil, commercial amyl alcohol; such as are used in the art. When certain proportions are employed in which grain or ethyl-alcohol becomes a considerable factor, the amyl-ethyl ether has itself solvent power on soluble pyroxyline. This is not the case, when the proportion of fusel oil (amyl alcohol) is large.

Having described my invention, what I claim, and desire to secure by Letters Patent, is—

1. A pyroxyline compound composed of pyroxyline dissolved in any common solvent mixed with a distillate obtained by etherification of alcohols with sulphuric acid.

2. A pyroxyline compound composed of a solution of pyroxyline in any common solvent such solution being diluted with a mixed ether obtained by etherification of a mixture of alcohols by sulphuric acid.

3. A pyroxyline compound composed of a solution of pyroxyline in any common solvent such solution being diluted with ethyl amyl ether.

LEONARD PAGET.

Witnesses:
   E. L. PAGET,
   E. D. GRANT.